United States Patent Office 3,013,827
Patented Dec. 19, 1961

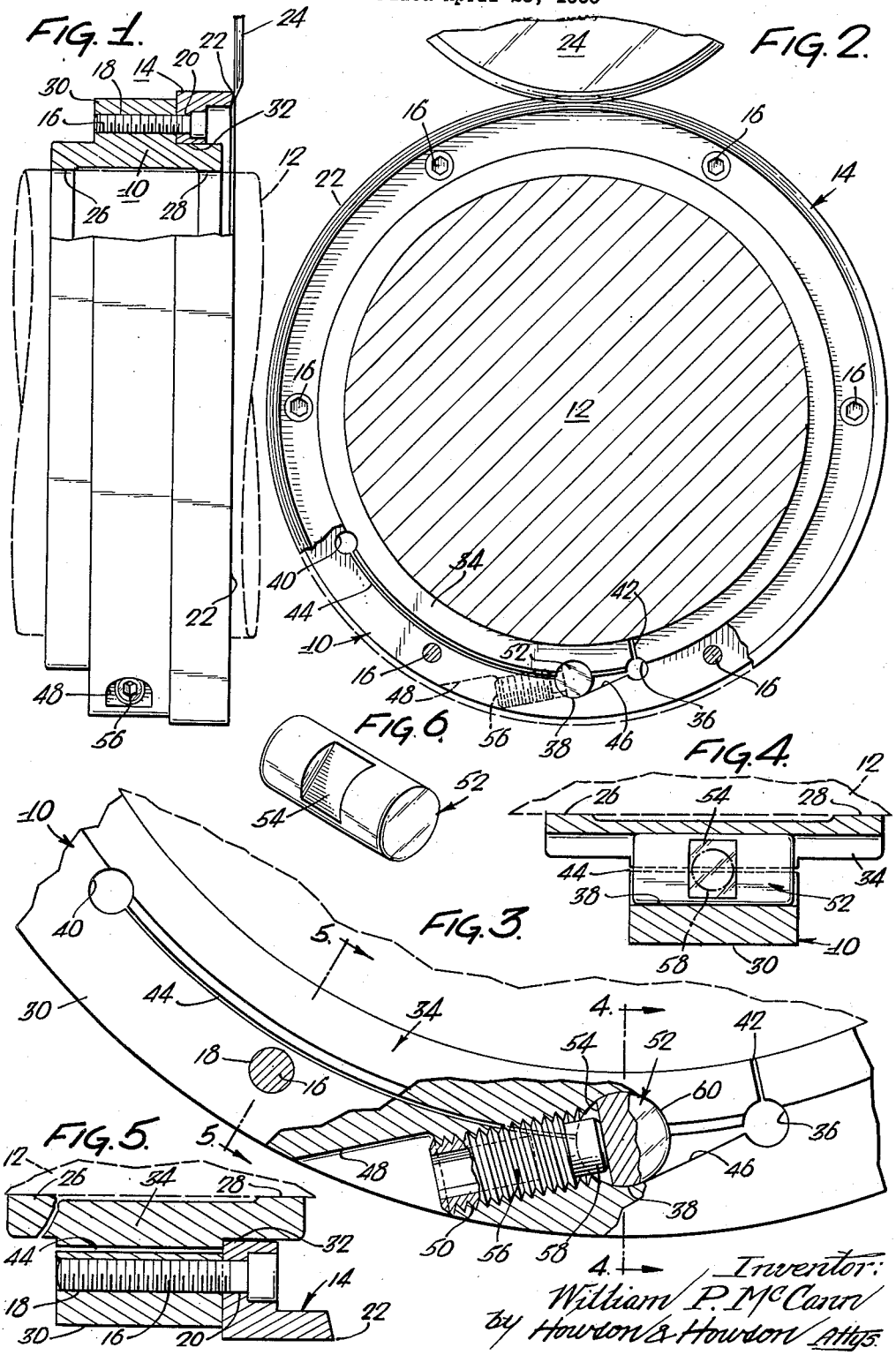

---

3,013,827
DEVICE FOR CLAMPING A PART BY FRICTION TO A SHAFT
William P. McCann, Camden, N.J., assignor to Samuel M. Langston Company, Camden, N.J., a corporation of New Jersey
Filed Apr. 23, 1959, Ser. No. 808,527
4 Claims. (Cl. 287—52)

The present invention relates broadly to a device for clamping a member to a shaft or column or the like and more specifically to improved mechanism adapted for clamping a part, by friction, to a shaft, column, quill or the like and which mechanism is susceptible of easy adjustment or repositioning on the member to which clamped.

Broadly the invention is applicable to permit clamping of a part of various geometrical shapes onto a shaft, column, quill or the like, by friction, in such a manner that it can be quickly and easily adjusted and repositioned laterally or angularly on the shaft or member to which attached, at any desired time so as to change or correct timing of operation of a mechanism or to provide for different set-ups in manufacturing operations and the like. This adjustment can be accomplished and the clamping can be facilitated without scoring or otherwise affecting a machined surface, for example, of a shaft or part to which secured, and further without disturbing alignment of an operating edge or operating surface of the part.

While as pointed out above the principles taught by the present invention are broadly applicable, for purposes of illustration one highly beneficial application of the invention will be described in detail hereinafter, wherein the device is used to clamp the hub of a paper slitter or cutter head to the horizontal slitter head shaft of a slitting and rewinding machine. The invention, however, is in no way limited to such application or the geometrical configuration required for such use.

Slitting and rewinding machines of a type for which the present invention is particularly suited are web winders of a three roll type such as shown in Langston et al. Patent 1,488,126, and Sieg Patents 1,827,802; 1,831,201 and 1,888,810. As well-known in the art, and as described in these patents, the usual purpose for this type of winder or rewinder is to permit cutting or slitting of a traveling web of paper or the like from a parent or mill roll into various desired widths, and/or trim edges followed by rewinding of the cut web into rolls of desired size. The mechanism of the present invention permits an easy adjustment or repositioning of a cutter head assembly on a cutter head shaft for changing the width of the paper being cut or slit without disturbing the alignment or true running of the cutter edge in relation to a mating slitter knife.

Heretofore attempts have been made to devise apparatus which would accomplish the same end result such for example as splitting the hub of a part, or the part and its hub if integral, on the diameter at one place and use one or more cap screws or other suitable fasteners to draw the member together. It has been found, however, that where such a hub or part is split in one or two pieces, the split hub or part will distort and the cutting edge of a cutter or slitter will not run true with the mating knife or cutter, since the cutting edge will not stay aligned but will turn with the edge too far away from the mating knife or cutter on one part of the periphery, and too close on the other part of the periphery, resulting in unsatisfactory slitting or trimming and off-tolerance width of the slit paper.

Another method utilized in the prior art was to split the hub or part at two places diametrically opposite, and hold the two halves together with two or more cap screws or other suitable fasteners preferably placed at an angle of 90° to the splits. This type of device was also susceptible of the foregoing disadvantages and in both applications, even though the hub or hub and part were trued up originally and subsequently adjusted or repositioned for a different width set-up, the misalignment as mentioned above resulted.

Other known devices utilized for example, tapered snap ring lock ups; bayonet type lock ups; key way lock ups; eccentric cam locking devices; and others. However, none of these prior known devices have been entirely satisfactory, and in many instances resulted in complex and costly mechanisms.

It is accordingly a primary object of the present invention to provide a device permitting easy adjustment and repositioning of a part either laterally or angularly or both, on a shaft or other member without marring a machined surface thereon and which overcomes the drawbacks of prior devices and arrangements.

The device of the present invention will permit a cutter or slitting knife attached to a member such as a shaft not only to run true when assembled on the shaft, but also subsequently when it has been adjusted or repositioned for a new set-up or to correct or change timing for a tool requiring angular adjustment.

Additional objects, features and advantages of the present invention will be more readily apparent from the following detailed description of an embodiment thereof, when taken together with the accompanying drawings in which:

FIG. 1 is a view in elevation, a part being in section, of a cutter head applied to a shaft and incorporating the present invention;

FIG. 2 is an elevational view of the mechanism of FIG. 1, taken at right angles thereto;

FIG. 3 is an enlarged fragmentary view of a portion of a cutter head in accordance with the present invention, mounted on a shaft, fragmentarily shown, a portion being in section for clarity of details;

FIG. 4 is a sectional view taken on line 4—4 of FIG. 3;

FIG. 5 is a sectional view taken on line 5—5 of FIG. 3; and

FIG. 6 is a perspective view of a cutter head stud utilized in the invention.

Referring now more specifically to the different views of the drawings, an annular shaped cutter head generally designated 10 is adapted for mounting on a driving shaft 12 of a usual type utilized in slitter cutters or the like, although it is to be understood that the shaft can constitute any cylindrical member or other geometric shape on which it is desired to adjustably fix or secure an additional part. The shaft shown in the drawings is of a type incorporated in a slitter and winder machine and would be driven by appropriate means. A cutter knife generally designated 14 is removably secured to the cutter head by means such as bolts or screws 16 in radially spaced positions around the cutter knife 10, and engaging in mating screw thread openings 18 and 20 in the cutter head and cutter knife 10 and 14 respectively. The cutter knife is of a usual annular construction having a cutting edge at 22 for coacting with the cutting edge of an upper cutter knife 24 of a usual type.

It will be noted that the inner periphery of the cutter head has lands at 26 and 28 in a manner to permit and insure proper alignment and positioning on the shaft 12 in a usual manner.

A peripheral collar is formed on the outer periphery of the cutter head at 30 in which the openings 18 are provided, and the back edge of the cutter knife 14 abuts against one side of this collar for proper positioning and aligning. The inner periphery 32 of the cutter knife 14 is in engagement with the outer periphery of cutter head 10 adjacent the collar 30. These various surfaces, as is usual, are very carefully machined for accuracy of operations.

The foregoing described structure is essentially standard and taught in the prior art. The present invention resides in the means for adjustably securing a member such as a cutter head to a shaft whereby it can be angularly or laterally displaced with respect to the shaft while preventing scoring or improper operation of a cutter, slitter or the like.

The means whereby the cutter head is adjustably secured on the shaft in any desired position basically consists in the provision of a leaf-like segment formed as a portion of the inner periphery of the cutter head hub, with means for forcing this segment against the shaft in frictional engagement therewith. This leaf-like segment shown at 34 is formed in the body of the cutter head hub in the following manner. Holes 36, 38 and 40 are drilled transversely through the hub of the cutter head. The holes 36 provides an opening for turning the piece so that a saw such as a band saw can be used to further saw the piece as will be described. The hole 38 will be used for containing a portion of an actuating mechanism, and the hole 40 constitutes a gauge point for the sawing operation to form the leaf-like segment 34, and to reduce the amount of force required for clamping the piece onto the shaft, also to be described hereinafter.

Following the drilling of these holes, a saw cut is made at 42 radially outwardly from the inner periphery of the hub in line with the center of hole 36. A circular saw cut of constant radius is then made along the line 44, with the ends thereof terminating in the holes 36 and 40 in line with the centers thereof. It will be seen that this cut along line 44 passes through the center of hole 38. The metal of the hub is also cut out long line 46 between holes 36 and 38 with one extended end thereof passing through the center of hole 36, and the opposite end thereof being tangential to the outside diameter of the hole 38. By means of these cuts, a leaf-like segment 34 is formed over a portion of the inner periphery of the cutter head hub which can pivot between the inside periphery of the hub and the hole 40 and which, when actuated as described below, will clamp this hub to the shaft.

A hole 48 is drilled inwardly from the outer periphery of the hub of the cutter head at 48, at an angle thereto, and subsequently a tapped screw-threaded hole 50 is formed as an extension of the hole 48 and terminates or opens into the hole 38 as more clearly shown in FIG. 3 of the drawings.

A cylindrical cutter head stud 52, having close tolerances to the diameter of the hole 38, is inserted in this hole. This cutter head stud has a flat bottom cut-out 54 formed therein. A threaded set screw 56 is in threaded engagement in the tapped hole 50 and its inner end 58 is engageable with the bottom of cut-out 54, as shown in FIG. 3.

In operation, when the cutter head stud is inserted in hole 38 and engaged by set screw 56 as shown in FIG. 3 and the set screw is adjusted downwardly, it forces the stud against surface portion 60 of hole 38 and with a wedging action against the surface formed along the cut-out line 46. This combination of forces tends to straighten the leaf-like segment out and at the same time force it toward the shaft, pivoting between hole 40 and the inner periphery of the cutter head hub.

This combined action clamps the cutter head or cutter knife hub to the shaft in the desired place on the shaft, and as will be obvious, upon release of the set screw 56, permits of easy adjustment to a different position, or repositioning at will, at the desired location and angular disposition on the drive shaft. It will be apparent therefore, that a cutter attached to a hub provided with this clamping arrangement will stay aligned and run true on the shaft, and that repositioning will not cause it to run out of true as might otherwise be the case if the hub were split in one or two places as is now done on existing clamping arrangements.

The device of the present invention provides a unique method and means for clamping a rotating or stationary part by friction, to a shaft, column or the like and permits periodic lateral and/or angular adjustment for repositioning thereof without effecting a machined surface of the shaft or the like to which attached, and without permitting the part to run out of alignment in its original or readjusted new position. The manner of construction of the leaf-like segment also insures a part which is strong and more rigid than is possible with other conventional arrangements or methods of clamping, and due to the type of action as described hereinbefore provides new and highly improved results.

Manifestly minor changes in details of construction can be effected without departing from the spirit and scope of the invention as defined in, and limited solely by the appended claims.

I claim:

1. A continuous interiorly annular fitting member adapted for adjustably surrounding and being clamped to a structural member, a leaf-like segment in said fitting constituting a portion of the inner periphery of said fitting and defined by a plurality of slits, said segment having a secured end and a free end, said fitting having a cylindrical bore extending therethrough offset from and in parallel alignment with the longitudinal axis of the annular fitting and extending partially into both the leaf-like segment of said fitting and the remainder of the fitting in proximity to the free end of said segment, a cylindrical stud in said bore, and adjustable means having an end thereof contacting said stud and the opposite end thereof being exposed to the exterior of said fitting and operable for forcing said stud toward the inner surface of said bore in an angular direction toward said free end to thereby force said leaf-like segment against the structural member.

2. A fitting as claimed in claim 1, said fitting having an extended slit in the body thereof and a second slit extending between said extended slit and the inner surface of said fitting, said slit forming said leaf-like segment of said fitting.

3. A fitting as claimed in claim 1, the remainder portion of said fitting adjacent said bore having an opening therein extending inwardly from said bore toward the free end of said segment and forming a wedging surface for coaction with said stud to force the free end of said segment toward said structural member.

4. A fitting as claimed in claim 3, said opening adjacent said bore extending from a point tangential to the outer side of said bore to said free end of said segment for forming the wedging surface.

References Cited in the file of this patent

UNITED STATES PATENTS

| 126,183 | Charlton | Apr. 30, 1872 |
| 1,174,288 | Rosenfeld | Mar. 7, 1916 |
| 2,491,976 | Hauser | Dec. 20, 1949 |
| 2,827,316 | Duffy | Mar. 18, 1958 |